United States Patent
Nair et al.

(10) Patent No.: US 6,654,952 B1
(45) Date of Patent: Nov. 25, 2003

(54) REGION BASED OPTIMIZATIONS USING DATA DEPENDENCE GRAPHS

(75) Inventors: Sreekumar Ramakrishnan Nair, Fremont, CA (US); Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/497,820

(22) Filed: Feb. 3, 2000

(51) Int. Cl.[7] ................................................ G06F 9/45
(52) U.S. Cl. ...................... 717/157; 717/143; 717/144; 717/161
(58) Field of Search ............................... 717/141–161, 717/124

(56) References Cited

U.S. PATENT DOCUMENTS

| | | | |
|---|---|---|---|
| 5,107,418 A | * 4/1992 | Cramer et al. ............... | 717/155 |
| 5,317,740 A | 5/1994 | Sites ........................... | 395/700 |
| 5,493,675 A | 2/1996 | Faiman, Jr. et al. ........ | 395/700 |
| 5,628,016 A | 5/1997 | Kukol .......................... | 395/704 |
| 5,659,754 A | * 8/1997 | Grove et al. ................. | 717/155 |
| 5,778,233 A | 7/1998 | Besaw et al. ............... | 395/709 |
| 5,790,859 A | * 8/1998 | Sarkar ......................... | 717/130 |
| 5,889,999 A | * 3/1999 | Berenitz, Jr. et al. ....... | 717/158 |
| 6,381,739 B1 | * 4/2002 | Berenitz, Jr. et al. ......... | 714/38 |

FOREIGN PATENT DOCUMENTS

| EP | 1 063 585 | 12/2000 | |
|---|---|---|---|
| EP | 1 063 585 A2 | 12/2000 | ............. G06F/9/06 |

OTHER PUBLICATIONS

Craig Chambers and Weimin Chen, Efficient Multiple and Predicate Dispatching, ACM© 1999 pp. 238–255.*
David Grove et al., Call Graph Construction in Object–Oriented Languages© 1997, pp. 108–123.*
Soo–Mook Moon Parallelizing Nonnumerical Code with Selective Scheduling and Software Pipellining © 1997 pp. 854–898.*

* cited by examiner

Primary Examiner—Tuan Q. Dam
Assistant Examiner—Chuck Kendall
(74) Attorney, Agent, or Firm—Thelen Reid & Priest LLP; Marc S. Hanish (57) ABSTRACT

Region based optimization may be accomplished by creating dependence graphs for each block and then incrementally computing a single dependence graph for the region. First dependence DAGs are created for each block in the region. This includes defining incoming and outgoing dangling edges for each block. Each dependence DAG is then linked as a control flow graph. Examining of each incoming dangling edge within each block of the region then takes place, with the process traversing each path along the control flow graph in reverse, attempting to match each incoming dangling edge with a corresponding incoming or outgoing dangling edge, stopping only if an outgoing match is found, the same block is examined twice, or the top of the region is found. A similar process takes place for each outgoing dangling edge, traversing each path along the control flow path forward, attempting to match each outgoing dangling edge with a corresponding incoming dangling edge, stopping only if a match is found, the same block is examined twice, or the bottom of the region is found. The region may then be reduced to a single block with incoming dangling edges being any unmatched incoming dangling edges at the top of the region and outgoing dangling edges being any unmatched outgoing dangling edges at the bottom of the region. Optimization may occur during or after this reduction step to improve performance in the program. Nested loops may be handled by building the dependence graph for the inner most loop first and treating it like a dependence DAG for a block when processing the outer loops.

24 Claims, 7 Drawing Sheets

REGION BASED OPTIMIZATIONS USING DATA DEPENDENCE GRAPHS

BACKGROUND OF THE INVENTION

1. Field of the Invention

The present invention relates to compilers. More specifically, the present invention relates to the use of data dependence graphs in optimizing regions of basic blocks in a compiler.

2. The Background

Figure 1:
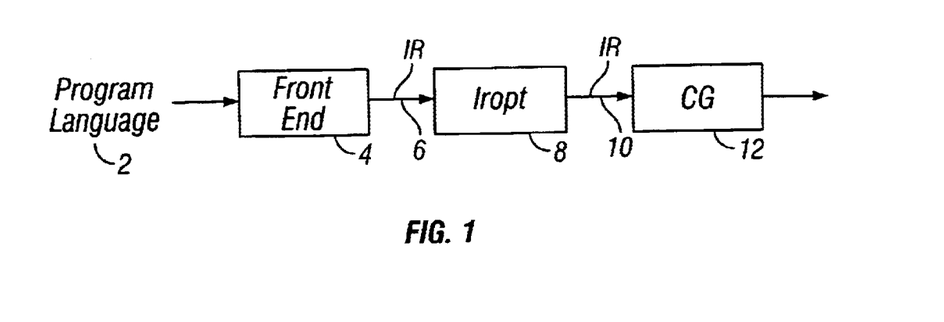
FIG. 1 is a block diagram illustrating the phases of a typical compiler.

A compiler is a program that reads a program written in one language, the source language, and translates it into an equivalent program in another language, the target language. A compiler may be broken up into several phases. FIG. 1 is a block diagram illustrating the phases of a typical compiler. A programming language 2 is fed into the compiler. The program language may be any programming language, such as C, C++, F77, F90, or Java. A front end 4 receives the programming language, and performs analysis (such as lexical analysis, syntax analysis, and semantic analysis) and intermediate code generation. The output of the front end 4 if an Intermediate Representation (IR) 6 of the program.

Ideally, the front end 4 would produce target code that is as efficient as code that could be written by hand. However, in the real world, this is usually not the case. Therefore, if a user wishes to have improved performance, the code must be optimized. Generally, this is performed by two components. An Intermediate Optimizer (iropt) 8 performs high level optimization, which would normally include the simpler, generic optimizations such as eliminating repetitive lines of code, resulting in IR 10. A Code Generator (CG) 12 may then be used to perform the more complex, target code-specific optimizations, such as utilizing registers and performing transformations. One of ordinary skill in the art will recognize, however, that the optimization could be combined into a single phase or could be performed by more than two phases.

Figure 2:
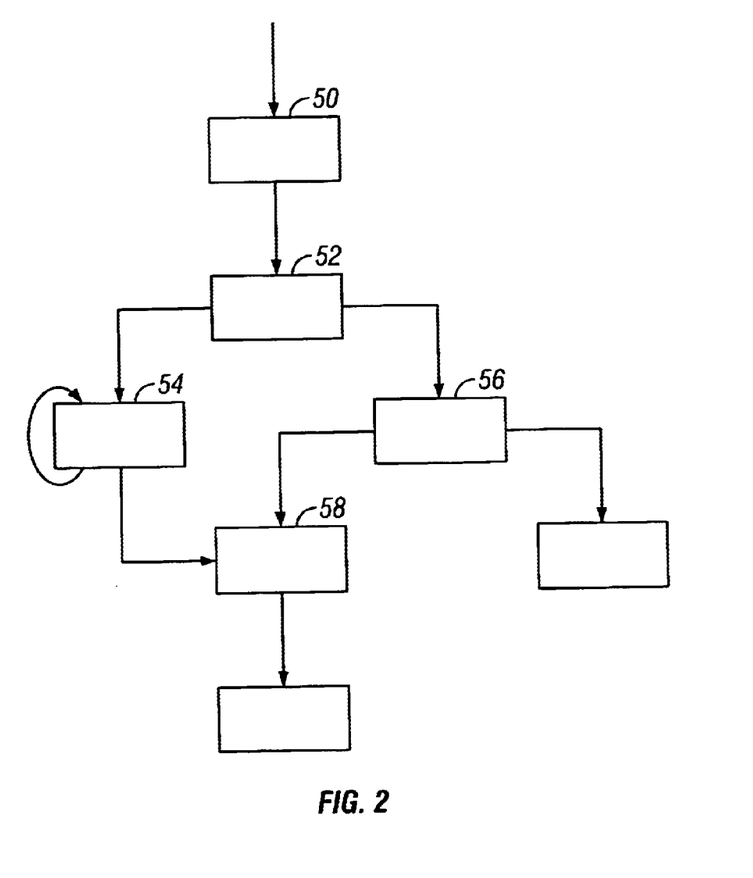
FIG. 2 is a graph illustrating an example of an intermediate representation represented as a control flow graph of basic blocks.

In order to optimize the code, most compilers begin by breaking up the IR into basic blocks. Technically, a basic block is defined as a sequence of consecutive statements in which flow of control enters at the beginning and leaves at the end without halt or possibility of branching except at the end. The basic block may also be comprised of operations and/or machine instructions. Throughout this application, however, the term "statements" will be used with the knowledge that they could easily be operations and/or machine instructions as well. FIG. 2 is a graph illustrating an example of an IR represented as basic blocks. The control flow proceeds to block 50, where the statements in block 50 are executed from beginning to end without branching. Then the control flow proceeds to block 52, where the statements in block 52 are executed from beginning to end without branching. After block 52, the control flow may branch either to block 54 or block 56. Block 54 may branch to block 58 or may loop back up to itself. The rest of the control flow proceeds in a similar fashion.

Figure 3:
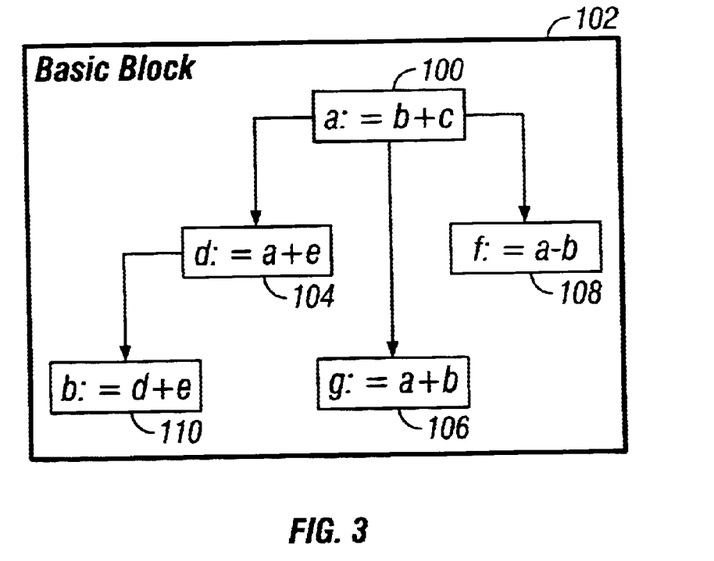
FIG. 3 is a graph illustrating an example of a dependence directed acyclical graph (DAG).

A standard method of optimization within each basic block is to use knowledge regarding the substance of each statement within the basic block to construct a dependence directed acyclical graph (dependence DAG) for each basic block. A dependence DAG is constructed by assigning a node to each statement in the basic block and connecting the nodes with edges based upon which statements must be performed before other statements in the block. FIG. 3 is a graph illustrating an example of a dependence DAG.

Assuming a basic block containing the following statements in order (the numbers in parenthesis indicate the reference number of the node assigned to each statement):

a :=b+c (100)
d :=a+e (104)
g :=a+b (106)
f :=a−b (108)
b :=d+e (110)

Node 100 is then assigned the statement computing a value a from b and c, the values for b and c initially coming from outside the basic block 102. Nodes 104, 106, and 108 all require as input the value a, but do not require as input any value computed by each other, and therefore the order in which any of these nodes is executed is irrelevant. Therefore, a dependency edge runs from Node 100 to each of nodes 104, 106, and 108. Node 110 requires as input the value b, which was computed in node 104, and therefore must be executed after node 104 and must depend on that node.

There are actually three types of dependence edges. The first is a flow edge, which is an edge from a definition to a use. Another is an anti-dependence edge, which is an edge from a use to a definition. The last is an output edge, which is an edge from a definition to a redefinition of the same variable. Control edges can also be considered a type of edge. Dependence edges are labeled with the register or variable carrying the dependence. Dangling edges are attached to a node on only one end. This disclosure concentrates on dangling flow dependence edges, but one of ordinary skill in the art can easily extend this to include dangling anti-dependence, output dependence, or control dependence edges as may be needed for other applications of these ideas such as scheduling a cross block.

Dependence DAGs are often used to perform scheduling tasks. In modem computers, it is often advantageous to schedule upcoming statements, which allows better performance by utilizing multiple functional units and avoiding pipeline stalls. Thus, a code generator will generally create a dependence DAG for a basic block, and then schedule statements within that block based upon the resulting dependence DAG.

While dependence DAGs are effective for optimizations within each basic block, they have not been used to optimize between the basic blocks. There may be variables which depend on calculations made in other blocks. Additionally, as their name suggests, directed acyclical graphs do not contain cycles, or loops. Thus when a loop exists in the control flow graph as in the example in FIG. 3, the dependence DAG for that basic block will not take that into consideration. Knowing this information might be helpful in reordering the flow of the basic blocks.

What is needed is an efficient method that allows for global optimization across a region of several basic blocks, or even a single basic block where a loop exists.

SUMMARY OF THE INVENTION

Region based optimization may be accomplished by creating dependence graphs for each block and then incrementally computing a single dependence graph for the region. First dependence DAGs are created for each block in the region. This includes defining incoming and outgoing dangling edges for each block. Each dependence DAG is then linked as a control flow graph. Examining of each incoming dangling edge within each block of the region then takes place, with the process traversing each path along the control flow graph in reverse, attempting to match each incoming dangling edge with a corresponding outgoing dangling edge, stopping only if a match is found, the same block is examined twice, or the top of the region is found. A similar process takes place for each outgoing dangling edge, traversing each path along the control flow path forward, attempting to match each outgoing dangling edge with a corresponding incoming or outgoing dangling edge, stopping only if an outgoing match is found or the bottom of the region is found. The path is terminated if the same block is reached twice. The region may then be reduced to a single block with incoming dangling edges being any unmatched incoming dangling edges at the top of the region and outgoing dangling edges being any unmatched outgoing dangling edges at the bottom of the region. Optimization may occur during or after this reduction step to improve performance in the program. Nested loops may be handled by building the dependence graph for the inner most loop first and treating it like a dependence DAG for a block when processing the outer loops.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after review of this disclosure.

In accordance with a presently preferred embodiment of the present invention, the components, processes and/or data structures are implemented using a compiler for a SPARC machine. Different implementations may be used and may include other types of programming languages, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The present invention involves computing a single dependence graph for a program (or region of program) incrementally from dependence graphs created for the basic blocks. The incremental construction of the single dependence graph is accomplished by using a dependence DAG for each basic block, and then attempting to connect any dangling edges in these chains to the same or other basic blocks.

Throughout the present application, two separate terms may be used to denote blocks of statements. A basic block, while having a dictionary meaning regarding a grouping of statements whose flow of control enters at the beginning and leaves at the end without halt or possibility of branching except at the end, is often used in the art to define simply the blocks that are used during the first pass at inter-block optimization. In other words, the code optimizer, before performing the analysis will break up the code into various blocks. Whether or not these blocks fulfill the traditional definition of basic blocks, they are often called blocks by those in the art. This specification will use the term blocks in this more liberal sense.

Another term used in this specification to denote blocks of statements will be a region. A region usually encompasses more than one basic block (for example, a typical region may be the group of basic blocks that make up a loop of basic blocks). However, a region could be a single basic block and, in fact, the technique utilized in the present invention involves occasionally treating complete regions as if they were no different than basic blocks so the term region should also have a liberal definition in this specification.

Figure 4:
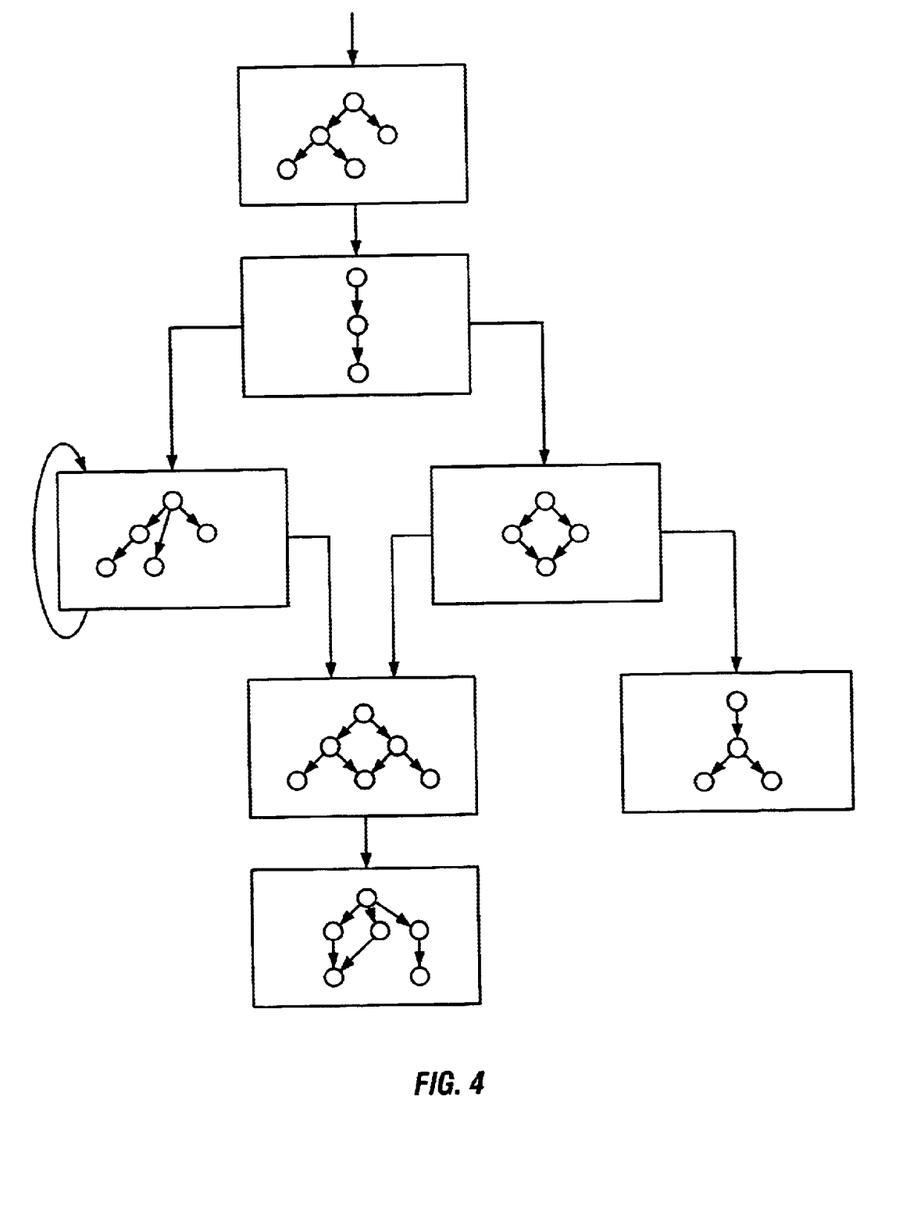
FIG. 4 is a graph illustrating an example of a dependence DAG for each basic block if the basic block control flow graph resembles FIG. 2.

The present invention may first build a dependence DAG for each basic block in a region. One of ordinary skill in the art will recognize that the present invention could be implemented on an entire program as well, but for simplicity, this application will simply refer to the invention as being performed on a region. FIG. 4 is a graph illustrating an example of a dependence DAG for each basic block if the basic block control flow graph resembles FIG. 2. As can be seen, the control flow graph can actually be combined with the dependence DAGs for each basic block.

Figure 5:
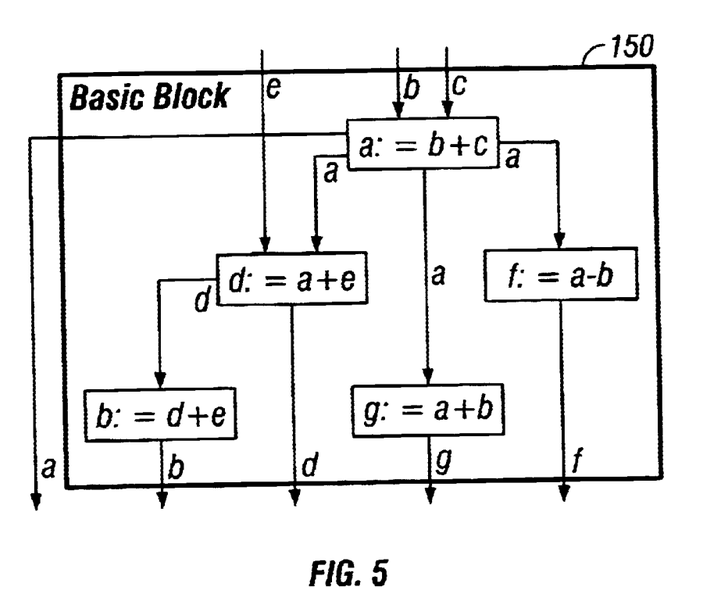
FIG. 5 is a graph illustrating the dependence DAG of FIG. 4 including the dangling edges.

In the present invention, the dependence DAGs will be built with "extra" edges, known as dangling edges. These include edges for variables used within the basic block but not previously defined within the basic block (incoming dangling edges) and edges for variables defined within the basic block and live coming out of the block (outgoing dangling edges). Variables are live coming out of the block if they have a chance of being used outside the block. An example of a case where a variable is defined within a block but is not live coming out of the block is a redefinition. If a is defined in a block but is redefined later in the block, the first instance of a, although defined within the block, is not live coming out of the block. Only the second instance of a would have an outgoing dangling edge. In many cases, a dependence DAG may include both an incoming and an outgoing dangling edge for the same variable within the same block. FIG. 5 is a graph illustrating the dependence DAG of FIG. 4 including the dangling edges. Basic block 150 includes incoming dangling edges for a, b, c, d, and e and outgoing dangling edges for a, b, d,f, and g.

The individual dependence DAGs will actually be referred to as dependence graphs from this point on, as they no longer are required to be acyclical. This is due to the fact that the present invention constructs a single, large, dependence graph by connecting the individual dangling edges (which may include connecting an incoming dangling edge to an outgoing dangling edge in the same basic block).

Figure 6:
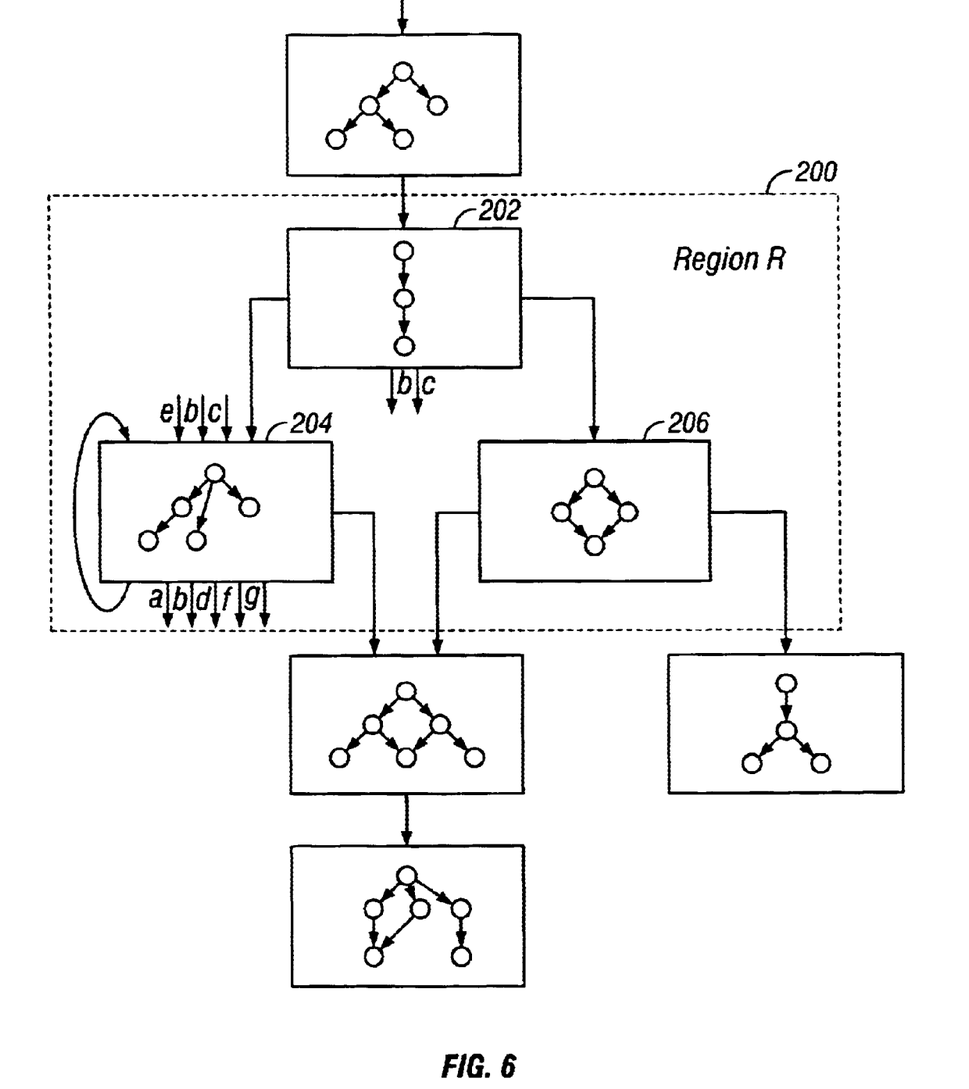
FIG. 6 is a graph illustrating the control flow graph of FIG. 5 with the dangling edges illustrated in FIG. 6.

FIG. 6 is a graph illustrating the control flow graph of FIG. 4 with the dangling edges illustrated in FIG. 5. Block 204 in FIG. 6 is equivalent to block 150 in FIG. 5.

Figure 7:
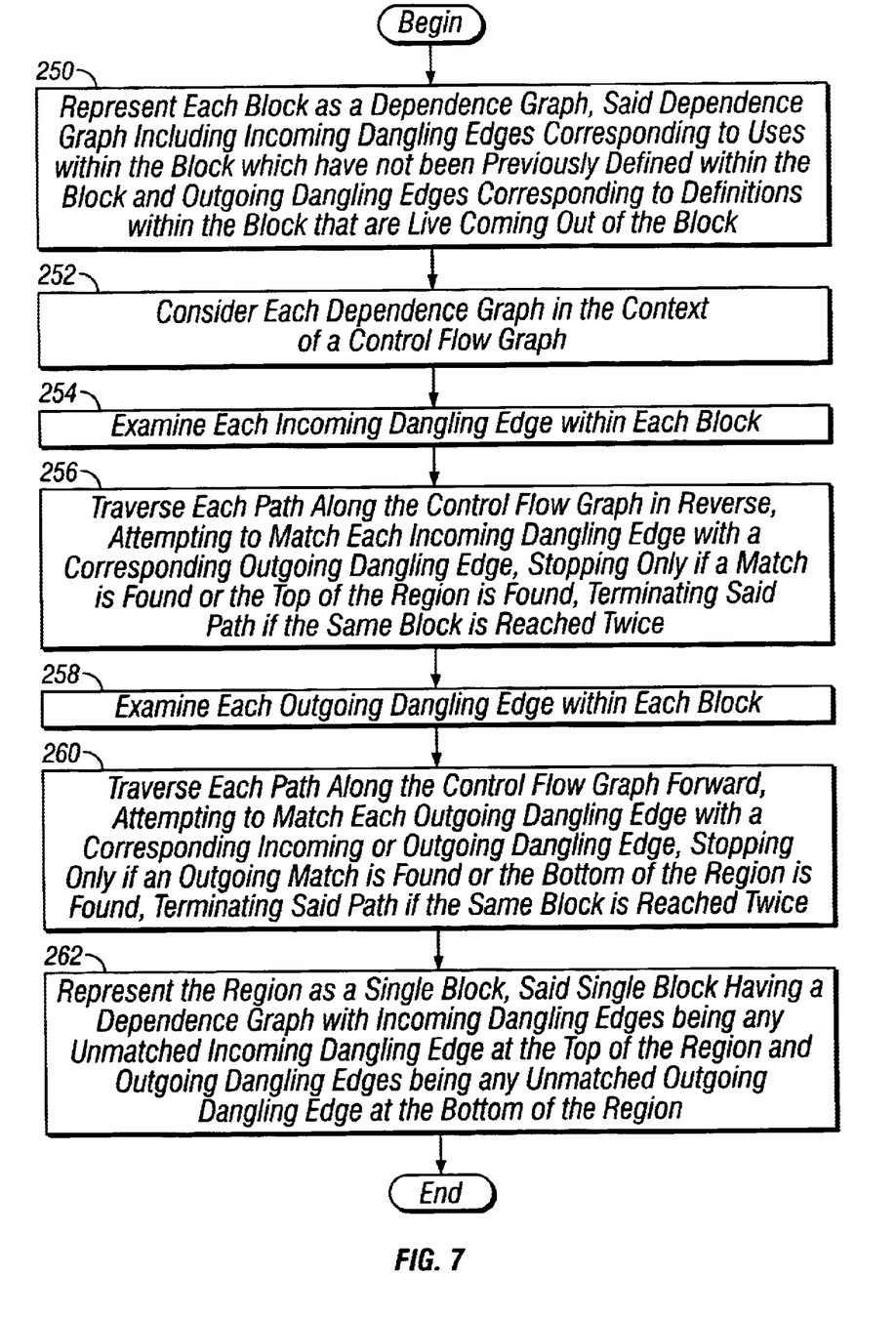
FIG. 7 is a flow diagram illustrating the method for performing region based optimizations of a program comprised of block according to a presently preferred of embodiment of the present invention.

FIG. 7 is a flow diagram illustrating the method for performing region based optimizations of a program comprised of blocks according to a presently preferred embodiment of the present invention. The method is applied to a region of blocks. Many times, the blocks will be basic blocks, however an implementation is possible where the method is executed on a region of blocks representing regions on which the method has already been executed.

At 250, each block is represented as a dependence graph, the dependence graph including incoming dangling edges corresponding to uses within the block which have not been previously defined within the block and outgoing dangling edges corresponding to definitions within the block that are live coming out of the block. Then at 252, each dependence graph is considered in the context of a control flow graph. In a way, this consideration may be thought of as creating a large control flow graph, with a dependence graph inside each block in the control flow graph. In reality, however, it is unlikely that such a large structure will in fact be created, as it is probably more efficient to simply examine the control flow graph along with the dependence graphs.

For each block B within a region R, each incoming dangling edge $E_i$ is examined at 254. For each of these incoming dangling edges $E_i$, at 256 each control flow path is traversed in reverse (i.e. up the control flow graph) looking for the first matching outgoing dangling edge $E_o$. If a match is found, then the fact that the incoming dangling edge $E_i$ is matched with outgoing dangling edge $E_o$ is recorded. A set of matching edges is one in which both edges share the same label. If the process reaches any block twice, due to a loop, it terminates that search path. If the process reaches the top of region R without any match, then incoming dangling edge $E_i$ is an incoming dangling edge to region R along that particular path. The result is that region R has incoming dangling edges but that within region R there are no unmatched incoming dangling edges between blocks.

A similar process is then run to determine outgoing dangling edges. For each block B within a region R, each outgoing dangling edge $E_o$ is examined at 258. For each of these outgoing dangling edges $E_o$, at 260 each control flow path is traversed forward (i.e. down the control flow graph) looking for the first matching incoming or outgoing dangling edge $E_i$ or $E_{o2}$. If a match is found, then the fact that the outgoing dangling edge $E_o$ is matched with the incoming or outgoing dangling edge or $E_{o2}$ is recorded. If the process reaches any block twice, due to a loop, it terminates that search path. If the process reaches the bottom of region R without any outgoing match, then outgoing dangling edge $E_o$ is an outgoing dangling edge to region R. The result is that region R has outgoing dangling edges but that within region R there are no unmatched outgoing dangling edges between blocks. It should be noted that this matching may be accomplished much more efficiently if the results of the process determining incoming dangling edges have been recorded, as there are already a number of matching incoming-outgoing dangling edges. Therefore, at 262, the region has been represented as a single block with incoming dangling edges being any unmatched dangling edge and outgoing dangling edges being any unmatched outgoing dangling edge.

Nested loops may be handled by performing the method outlined above to the inner most loop first, and then treating the inner most loop as a single dependence DAG when processing the outer loops. This recursive application of the method can be applied to any region of blocks.

Referring to FIG. 6, a region R 200 may be examined, which includes blocks 202, 204, and 206. Block 202 is examined using the method for determining incoming dangling edges outlined above, however there is only one path up the control flow graph from block 202 and it leads to the top of the region, so there is nothing to examine. Moving to block 204, there are three incoming dangling edges (b, c, and e) and three separate paths up the control flow path. The first path is up to block 202 and then to the top of the region. The second path is around the loop and back to block 204, and then up to block 202 and then out of the region. The third path is around the loop and back to block 204, then around the block again and back to block 204 (since the same block is examined twice, the path is terminated). Examining the first path would involve attempting to match edges b, c, and e with any outgoing dangling edges in block 202. Here, there is a matching outgoing dangling edge for b and c, therefore the only unmatched dangling edges after examination of this path is e. Examining the second path again finds matches for b and c, but not for e. The third path, however, gets terminated before reaching the top of the region. Therefore e remains unmatched and is an incoming dangling edge to region R. Examination of block 206 proceeds in a similar fashion. The process for determining outgoing dangling edges is then performed.

Figure 8:
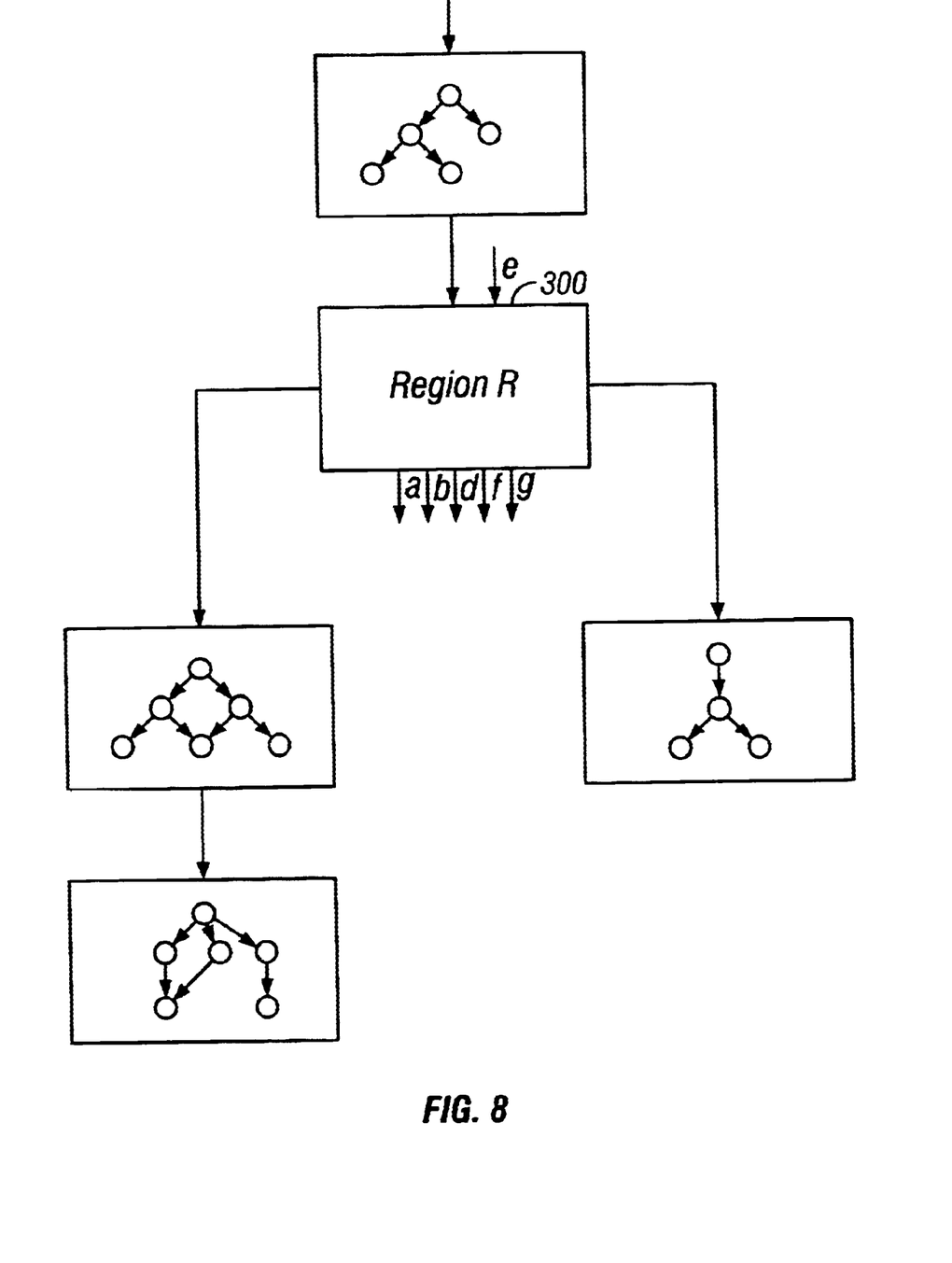
FIG. 8 is a graph illustrating a control flow graph as it would appear after performance of the method of the present invention.

FIG. 8 is a graph illustrating a control flow graph as it would appear after performance of the method of the present invention. Region R 300 has been reduced (and perhaps optimized) and has incoming dangling edge e and outgoing dangling edges a, b, d, f and g.

Figure 9:
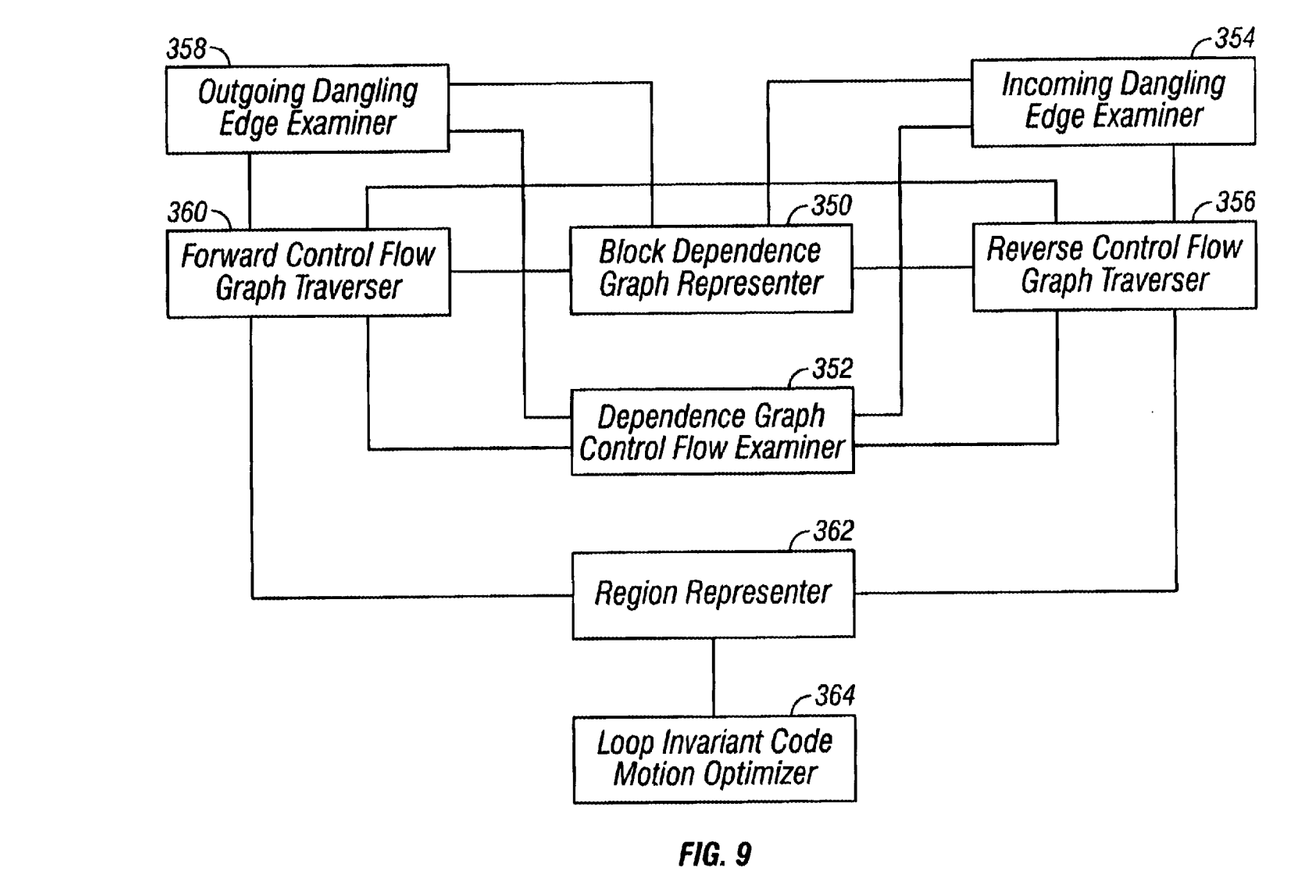
FIG. 9 is a block diagram illustrating an apparatus for performing region based optimizations of a program comprised of blocks according to a presently preferred embodiment of the present invention.

FIG. 9 is a block diagram illustrating an apparatus for performing region based optimizations of a program comprised of blocks according to a presently preferred embodiment of the present invention.

A block dependence graph representer 350 represents each block as a dependence graph, the dependence graph including incoming dangling edges corresponding to uses within the block which have not previously been defined within the block and outgoing dangling edges corresponding to definitions within the block that are live coming out of the block. A dependence graph control flow examiner 352 coupled to said block dependence graph representer 350 considers each dependence graph in the context of a control flow graph.

An incoming dangling edge examiner 354 coupled to said block dependence graph representer 350 and said dependence graph control flow examiner 352 examines each incoming dangling edge $E_i$ for each block B within a region R. A reverse control flow graph traverser 356 coupled to said incoming dangling edge examiner 354, said block dependence graph representer 350 and said dependence graph flow examiner 352 traverses each control flow path in reverse for each of these incoming dangling edges $E_i$, looking for the first matching outgoing dangling edge $E_o$. If a match is found, then the fact that the incoming dangling edge $E_i$ is matched with outgoing dangling edge $E_o$ is recorded by the block dependence graph representer 350. If the process reaches any block twice, due to a loop, it terminates that search path. If the process reaches the top of region R without any match, then incoming dangling edge $E_i$ is an incoming dangling edge to region R. The result is a region R with incoming dangling edges but no unmatched incoming dangling edges between blocks within region R.

An outgoing dangling edge examiner 358 coupled to said block dependence graph representer 350 and said dependence graph control flow examiner 352 examines each outgoing dangling edge $E_o$ for each block B within a region R. A forward control flow graph traverser 360 coupled to said outgoing dangling edge examiner 358, said block dependence graph representer 350 and said dependence graph flow examiner 352 traverses each control flow path forward for each of these outgoing dangling edges $E_o$, looking for the first matching incoming or outgoing dangling edge $E_i$ or $E_{o2}$. If a match is found, then the fact that the outgoing dangling edge $E_o$ is matched with incoming or outgoing dangling edge $E_i$ or $E_{o2}$ is recorded by the block dependence graph representer 350. If the process reaches any block twice, due to a loop, it terminates that search path. If the process reaches the bottom of region R without any outgoing match, then outgoing dangling edge $E_o$ is an outgoing dangling edge to region R. The result is a region R with outgoing dangling edges but no unmatched outgoing dangling edges between blocks within region R.

A region representer 362 coupled to said reverse control flow graph traverser 356 and said forward control flow graph traverser 360 represents the region as a single block, said single block having a dependence graph with incoming dangling edges being any unmatched dangling edge and outgoing dangling edges being any unmatched outgoing dangling edge. A loop invariant code motion optimizer 364 may be coupled to said region representer 362 to perform loop invariant code motion optimization during or after this reduction to a single block.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for performing region based optimizations of a program comprised of blocks including:
   representing each block as a dependence graph, said dependence graph including incoming dangling edges corresponding to uses within the block which have not been previously defined within the block and outgoing dangling edges corresponding to definitions within the block that are live coming out of the block;
   considering each dependence graph in the context of a control flow graph;
   reducing a region of dependence graphs by:
      examining each incoming dangling edge within each block;
      traversing each path along the control flow graph in reverse, attempting to match each incoming dangling edge with a corresponding outgoing dangling edge, stopping only if a match is found or the top of the region is found, terminating said path if the same block is reached twice;
      examining each outgoing dangling edge within each block;
      traversing each path along the control flow graph forward, attempting to match each outgoing dangling edge with a corresponding incoming or outgoing dangling edge, stopping only if an outgoing match is found or the bottom of the region is found, terminating said path if the same block is reached twice;
   representing the region as a single block, said single block having a dependence graph with incoming dangling edges being any unmatched incoming dangling edge at the top of the region and outgoing dangling edges being any unmatched outgoing dangling edge at the bottom of the region.

2. The method of claim 1, further including optimizing said region during or after said reducing.

3. The method of claim 2, wherein said optimization includes performing loop invariant code motion.

4. The method of claim 1, wherein each block is a basic block.

5. The method of claim 4, wherein each dependence graph is a dependence directed acyclical graph (DAG).

6. The method of claim 1, wherein each block is a region of blocks on which the method has already been performed.

7. The method of claim 1, wherein said traversing each path along the control flow graph forward uses the results of said traversing each path along the control flow graph in reverse in determining if matches are found.

8. The method of claim 1, wherein said dangling edges include flow dependence, anti-dependence, output dependence, and control dependence dangling edges.

9. An apparatus for performing region based optimizations of a program comprised of blocks including:
   a block dependence graph representer;
   a dependence graph control flow examiner coupled to said block dependence graph representer;
   an incoming dangling edge examiner coupled to said block dependence graph representer and said dependence graph control flow examiner;
   a reverse control flow graph traverser coupled to said incoming dangling edge examiner, said block dependence graph representer, and said dependence graph control flow examiner;
   an outgoing dangling edge examiner coupled to said block dependence graph representer and said dependence graph control flow examiner;
   a forward control flow graph traverser coupled to said outgoing dangling edge examiner, said reverse control flow graph traverser, said block dependence graph representer, and said dependence graph control flow examiner; and
   a region representer coupled to said reverse control flow graph traverser and said forward control flow graph traverser.

10. The apparatus of claim 9, further including a loop invariant code motion optimizer coupled to said region representer.

11. The apparatus of claim 9, wherein each block is a basic block.

12. The apparatus of claim 9, wherein each block is a region of blocks reduced by said apparatus before.

13. A method for providing an apparatus for performing region based optimizations of a program comprised of blocks, comprising the steps of:
   providing an apparatus, the provided apparatus including:
   a block dependence graph representer;
   a dependence graph control flow examiner coupled to said block dependence graph representer;
   an incoming dangling edge examiner coupled to said block dependence graph representer and said dependence graph control flow examiner;
   a reverse control flow graph traverser coupled to said incoming dangling edge examiner, said block dependence graph representer, and said dependence graph control flow examiner;

an outgoing dangling edge examiner coupled to said block dependence graph representer and said dependence graph control flow examiner;

a forward control flow graph traverser coupled to said outgoing dangling edge examiner, said reverse control flow graph traverser, said block dependence graph representer, and said dependence graph control flow examiner; and a region representer coupled to said reverse control flow graph traverser and said forward control flow graph traverser.

14. The method of claim 13, further comprising the step of providing a loop invariant code motion optimizer coupled to said region representer.

15. The method of claim 13, wherein each block is a basic block.

16. The method of claim 13, wherein each block is a region of blocks reduced by said apparatus before.

17. A program storage device readable by a machine, tangibly embodying a program of instructions executable by the machine to perform a method for performing region based optimizations of a program comprised of blocks, the method including:

representing each block as a dependence graph, said dependence graph including incoming dangling edges corresponding to uses within the block which have not been previously defined within the block and outgoing dangling edges corresponding to definitions within the block that are live coming out of the block;

considering each dependence graph in the context of a control flow graph;

reducing a region of dependence graphs by:
  examining each incoming dangling edge within each block;
  traversing each path along the control flow graph in reverse, attempting to match each incoming dangling edge with a corresponding outgoing dangling edge, stopping only if a match is found or the top of the region is found, terminating said path if the same block is reached twice;
  examining each outgoing dangling edge within each block;
  traversing each path along the control flow graph forward, attempting to match each outgoing dangling edge with a corresponding incoming or outgoing dangling edge, stopping only if an outgoing match is found or the bottom of the region is found, terminating said path if the same block is reached twice;

representing the region as a single block, said single block having a dependence graph with incoming dangling edges being any unmatched incoming dangling edge at the top of the region and outgoing dangling edges being any unmatched outgoing dangling edge at the bottom of the region.

18. The program storage device of claim 17, wherein said method further includes optimizing said region during or after said reducing.

19. The program storage device of claim 18, wherein said optimization includes performing loop invariant code motion.

20. The program storage device of claim 17, wherein each block is a basic block.

21. The program storage device of claim 20, wherein each dependence graph is a dependence directed acyclical graph (DAG).

22. The program storage device of claim 17, wherein each block is a region of blocks on which the method has already been performed.

23. The program storage device of claim 17, wherein said traversing each path along the control flow graph forward uses the results of said traversing each path along the control flow graph in reverse in determining if matches are found.

24. The program storage device of claim 17, wherein said dangling edges include flow dependence, anti-dependence, output dependence, and control dependence dangling edges.

* * * * *

UNITED STATES PATENT AND TRADEMARK OFFICE
CERTIFICATE OF CORRECTION

PATENT NO. : 6,654,952 B1
DATED : November 25, 2003
INVENTOR(S) : Sreekumar Ramakrishnan Nair and Peter C. Damron

It is certified that error appears in the above-identified patent and that said Letters Patent is hereby corrected as shown below:

Column 2,
Line 35, replace "modem" with -- modern --.

Column 3,
Line 39, after "preferred" delete "of".

Signed and Sealed this

Thirtieth Day of March, 2004

JON W. DUDAS
*Acting Director of the United States Patent and Trademark Office*